(12) United States Patent
Van Dan Elzen et al.

(10) Patent No.: US 10,875,403 B2
(45) Date of Patent: Dec. 29, 2020

(54) VEHICLE VISION SYSTEM WITH ENHANCED NIGHT VISION

(71) Applicant: MAGNA ELECTRONICS INC., Auburn Hills, MI (US)

(72) Inventors: Christopher L. Van Dan Elzen, Rochester, MI (US); Yuesheng Lu, Farmington Hills, MI (US); Ove Salomonsson, Farmington Hills, MI (US); William J. Chundrlik, Jr., Rochester Hills, MI (US); Tom H. Toma, Waterford, MI (US); Umer Shahid, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 74 days.

(21) Appl. No.: 15/334,364

(22) Filed: Oct. 26, 2016

(65) Prior Publication Data

US 2017/0113613 A1    Apr. 27, 2017

Related U.S. Application Data

(60) Provisional application No. 62/246,869, filed on Oct. 27, 2015.

(51) Int. Cl.
*H04N 5/225* (2006.01)
*B60K 35/00* (2006.01)
(Continued)

(52) U.S. Cl.
CPC .......... *B60K 35/00* (2013.01); *G06K 9/00791* (2013.01); *G06K 9/209* (2013.01); *H04N 5/2252* (2013.01); *H04N 5/2257* (2013.01);
*H04N 5/2258* (2013.01); *H04N 5/2351* (2013.01); *H04N 5/23238* (2013.01); *H04N 5/247* (2013.01); *H04N 5/33* (2013.01);
(Continued)

(58) Field of Classification Search
CPC .. H04N 5/2252; H04N 5/23238; H04N 5/247; H04N 5/33; B60R 1/00; B60R 2300/105; B60R 2300/106; B60R 2300/30; B60R 2300/8053
USPC ......................................... 348/38, 28, 33, 34
See application file for complete search history.

(56) References Cited

U.S. PATENT DOCUMENTS 2,632,040 A    3/1953  Rabinow
2,827,594 A    3/1958  Rabinow
(Continued)

*Primary Examiner* — Jamie J Atala
*Assistant Examiner* — Kahtleen V Nguyen
(74) *Attorney, Agent, or Firm* — Honigman LLP

(57) ABSTRACT

A vision system of a vehicle includes a camera module configured to be disposed at and behind a vehicle windshield, with the camera module including a first camera and a second camera. The first camera includes a first imager and a first lens having a wide angle field of view greater than 100 degrees. The first camera is operable to capture image data for processing by an image processor. The second camera includes a second imager and a second lens having a narrow angle field of view less than 40 degrees. The second camera is operable to capture image data for displaying color images at a display screen. Image data captured by the first camera is processed to detect objects, and image data captured by the first camera is not video procesed for display of video images. The vision system switches between daytime mode and nighttime mode responsive to ambient light.

19 Claims, 8 Drawing Sheets

(51) Int. Cl.
*H04N 5/247* (2006.01)
*H04N 5/232* (2006.01)
*G06K 9/00* (2006.01)
*H04N 9/04* (2006.01)
*H04N 5/235* (2006.01)
*H04N 5/33* (2006.01)
*G06K 9/20* (2006.01)

(52) U.S. Cl.
CPC ....... *H04N 9/045* (2013.01); *B60K 2370/152* (2019.05); *B60K 2370/20* (2019.05); *G06K 9/2027* (2013.01)

(56) References Cited

U.S. PATENT DOCUMENTS

| | | |
|---|---|---|
| 3,141,393 A | 7/1964 | Platt |
| 3,601,614 A | 8/1971 | Platzer |
| 3,612,666 A | 10/1971 | Rabinow |
| 3,665,224 A | 5/1972 | Kelsey |
| 3,680,951 A | 8/1972 | Jordan |
| 3,689,695 A | 9/1972 | Rosenfield et al. |
| 3,708,231 A | 1/1973 | Walters |
| 3,746,430 A | 7/1973 | Brean |
| 3,807,832 A | 4/1974 | Castellion |
| 3,811,046 A | 5/1974 | Levick |
| 3,813,540 A | 5/1974 | Albrecht |
| 3,862,798 A | 1/1975 | Hopkins |
| 3,947,095 A | 3/1976 | Moultrie |
| 3,962,600 A | 6/1976 | Pittman |
| 3,985,424 A | 10/1976 | Steinacher |
| 3,986,022 A | 10/1976 | Hyatt |
| 4,037,134 A | 7/1977 | Löper |
| 4,052,712 A | 10/1977 | Ohama et al. |
| 4,093,364 A | 6/1978 | Miller |
| 4,111,720 A | 9/1978 | Michel et al. |
| 4,161,653 A | 7/1979 | Bedini |
| 4,200,361 A | 4/1980 | Malvano |
| 4,214,266 A | 7/1980 | Myers |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,647,161 A | 3/1987 | Müller |
| 4,653,316 A | 3/1987 | Fukuhara |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,727,290 A | 2/1988 | Smith et al. |
| 4,731,669 A | 3/1988 | Hayashi et al. |
| 4,741,603 A | 5/1988 | Miyagi |
| 4,768,135 A | 8/1988 | Kretschmer et al. |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,862,037 A | 8/1989 | Farber et al. |
| 4,867,561 A | 9/1989 | Fujii et al. |
| 4,872,051 A | 10/1989 | Dye |
| 4,881,019 A | 11/1989 | Shiraishi et al. |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,910,591 A | 3/1990 | Petrossian et al. |
| 4,917,477 A | 4/1990 | Bechtel et al. |
| 4,937,796 A | 6/1990 | Tendler |
| 4,956,591 A | 9/1990 | Schierbeek |
| 4,961,625 A | 10/1990 | Wood et al. |
| 4,967,319 A | 10/1990 | Seko |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,121,200 A | 6/1992 | Choi |
| 5,124,549 A | 6/1992 | Michaels et al. |
| 5,148,014 A | 9/1992 | Lynam |
| 5,168,378 A | 12/1992 | Black |
| 5,170,374 A | 12/1992 | Shimohigashi et al. |
| 5,172,235 A | 12/1992 | Wilm et al. |
| 5,182,502 A | 1/1993 | Slotkowski et al. |
| 5,184,956 A | 2/1993 | Langlais et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,276,389 A | 1/1994 | Levers |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,406,395 A | 4/1995 | Wilson et al. |
| 5,410,346 A | 4/1995 | Saneyoshi et al. |

(56) References Cited

U.S. PATENT DOCUMENTS

| | | |
|---|---|---|
| 5,414,257 A | 5/1995 | Stanton |
| 5,414,461 A | 5/1995 | Kishi et al. |
| 5,416,318 A | 5/1995 | Hegyi |
| 5,424,952 A | 6/1995 | Asayama |
| 5,426,294 A | 6/1995 | Kobayashi et al. |
| 5,430,431 A | 7/1995 | Nelson |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,510,983 A | 4/1996 | Iino |
| 5,515,448 A | 5/1996 | Nishitani |
| 5,528,698 A | 6/1996 | Kamei et al. |
| 5,529,138 A | 6/1996 | Shaw et al. |
| 5,530,420 A | 6/1996 | Tsuchiya et al. |
| 5,530,771 A | 6/1996 | Maekawa |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,568,027 A | 10/1996 | Teder |
| 5,574,443 A | 11/1996 | Hsieh |
| 5,614,788 A | 3/1997 | Mullins |
| 5,627,586 A | 5/1997 | Yamasaki |
| 5,634,709 A | 6/1997 | Iwama |
| 5,638,116 A | 6/1997 | Shimoura et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,670,935 A | 9/1997 | Schofield et al. |
| 5,675,489 A | 10/1997 | Pomerleau |
| 5,757,949 A | 5/1998 | Kinoshita et al. |
| 5,760,826 A | 6/1998 | Naver |
| 5,760,828 A | 6/1998 | Cortes |
| 5,760,931 A | 6/1998 | Saburi et al. |
| 5,760,962 A | 6/1998 | Schofield et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,837,994 A | 11/1998 | Stam et al. |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,897 A | 3/1999 | Schofield et al. |
| 5,883,739 A | 3/1999 | Ashihara et al. |
| 5,890,021 A | 3/1999 | Onoda |
| 5,896,085 A | 4/1999 | Mori et al. |
| 5,923,027 A | 7/1999 | Stam et al. |
| 5,929,786 A | 7/1999 | Schofield et al. |
| 5,949,331 A | 9/1999 | Schofield et al. |
| 5,959,555 A | 9/1999 | Furuta |
| 5,963,247 A | 10/1999 | Banitt |
| 5,990,469 A | 11/1999 | Bechtel et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,024 A | 8/2000 | Stam et al. |
| 6,124,886 A | 9/2000 | DeLine et al. |
| 6,144,022 A | 11/2000 | Tennenbaum et al. |
| 6,172,613 B1 | 1/2001 | DeLine et al. |
| 6,201,642 B1 | 3/2001 | Bos |
| 6,222,447 B1 | 4/2001 | Schofield et al. |
| 6,243,003 B1 | 6/2001 | DeLine et al. |
| 6,278,377 B1 | 8/2001 | DeLine et al. |
| 6,326,613 B1 | 12/2001 | Heslin et al. |
| 6,353,392 B1 | 3/2002 | Schofield et al. |
| 6,396,397 B1 | 5/2002 | Bos et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,433,676 B2 | 8/2002 | DeLine et al. |
| 6,442,465 B2 | 8/2002 | Breed et al. |
| 6,445,287 B1 | 9/2002 | Schofield et al. |
| 6,498,620 B2 | 12/2002 | Schofield et al. |
| 6,553,130 B1 | 4/2003 | Lemelson et al. |
| 6,559,435 B2 | 5/2003 | Schofield et al. |
| 6,611,202 B2 | 8/2003 | Schofield et al. |
| 6,636,258 B2 | 10/2003 | Strumolo |
| 6,672,731 B2 | 1/2004 | Schnell et al. |
| 6,690,268 B2 | 2/2004 | Schofield et al. |
| 6,806,452 B2 | 10/2004 | Bos et al. |
| 6,822,563 B2 | 11/2004 | Bos et al. |
| 6,824,281 B2 | 11/2004 | Schofield et al. |
| 6,891,563 B2 | 5/2005 | Schofield et al. |
| 6,946,978 B2 | 9/2005 | Schofield |
| 6,953,253 B2 | 10/2005 | Schofield et al. |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,123,168 B2 | 10/2006 | Schofield |
| 7,145,519 B2 | 12/2006 | Takahashi et al. |
| 7,161,616 B1 | 1/2007 | Okamoto et al. |
| 7,227,459 B2 | 6/2007 | Bos et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,301,466 B2 | 11/2007 | Asai |
| 7,480,149 B2 | 1/2009 | Deward et al. |
| 7,592,928 B2 | 9/2009 | Chinomi et al. |
| 7,626,749 B2 | 12/2009 | Baur et al. |
| 7,720,580 B2 | 5/2010 | Higgins-Luthman |
| 7,855,755 B2 | 12/2010 | Weller et al. |
| 7,881,496 B2 | 2/2011 | Camilleri et al. |
| 7,994,462 B2 | 8/2011 | Schofield et al. |
| 8,256,821 B2 | 9/2012 | Lawlor et al. |
| 8,630,037 B1* | 1/2014 | Osterman ............. G02B 5/281 |
| | | 359/350 |
| 8,830,318 B2* | 9/2014 | Diehl ................... B60R 1/00 |
| | | 348/148 |
| 2002/0015153 A1 | 2/2002 | Downs |
| 2002/0126875 A1 | 9/2002 | Naoi et al. |
| 2004/0114381 A1 | 6/2004 | Salmeen et al. |
| 2005/0219852 A1 | 10/2005 | Stam et al. |
| 2006/0018511 A1 | 1/2006 | Stam et al. |
| 2006/0018512 A1 | 1/2006 | Stam et al. |
| 2006/0091813 A1 | 5/2006 | Stam et al. |
| 2007/0035627 A1* | 2/2007 | Cleary ............ G08B 13/19663 |
| | | 348/159 |
| 2007/0092245 A1* | 4/2007 | Bazakos ............ G06K 9/00255 |
| | | 396/427 |
| 2010/0020170 A1* | 1/2010 | Higgins-Luthman ........................ |
| | | B60Q 1/1423 |
| | | 348/135 |
| 2010/0208072 A1* | 8/2010 | Murano ................ B60K 35/00 |
| | | 348/148 |
| 2011/0149152 A1* | 6/2011 | Yamamura ............... H04N 9/31 |
| | | 348/453 |
| 2011/0234749 A1* | 9/2011 | Alon .................... G07C 5/0866 |
| | | 348/36 |

(56) References Cited

U.S. PATENT DOCUMENTS

| | | | |
|---|---|---|---|
| 2013/0182756 A1* | 7/2013 | Furlan | G06T 5/002 |
| | | | 375/240.02 |
| 2013/0222593 A1* | 8/2013 | Byrne | B60R 1/00 |
| | | | 348/148 |
| 2013/0286193 A1* | 10/2013 | Pflug | B60R 1/00 |
| | | | 348/135 |
| 2014/0160284 A1 | 6/2014 | Achenbach et al. | |
| 2014/0218529 A1 | 8/2014 | Mahmoud et al. | |
| 2014/0372020 A1* | 12/2014 | Stein | G01C 21/3602 |
| | | | 701/410 |
| 2015/0015713 A1 | 1/2015 | Wang et al. | |
| 2015/0062342 A1* | 3/2015 | Hoek | B60R 1/12 |
| | | | 348/148 |
| 2015/0124098 A1 | 5/2015 | Winden et al. | |
| 2015/0229819 A1* | 8/2015 | Rivard | H04N 5/2354 |
| | | | 348/362 |
| 2015/0327398 A1 | 11/2015 | Achenbach et al. | |
| 2016/0119527 A1 | 4/2016 | Shahid et al. | |
| 2016/0162747 A1 | 6/2016 | Singh | |
| 2016/0309098 A1* | 10/2016 | Montandon | H04N 5/2258 |
| 2016/0325681 A1 | 11/2016 | Van Dan Elzen | |
| 2016/0339959 A1* | 11/2016 | Lee | B62D 15/0265 |
| 2017/0083774 A1 | 3/2017 | Solar et al. | |
| 2017/0113613 A1 | 4/2017 | Van Dan Elzen et al. | |
| 2017/0257546 A1 | 9/2017 | Shahid | |

\* cited by examiner

Filter 3: camera lens IR filter + windshield IR filter

Can change the location and width of the 2nd pass-band.

VEHICLE VISION SYSTEM WITH ENHANCED NIGHT VISION

CROSS REFERENCE TO RELATED APPLICATION

The present application claims the filing benefits of U.S. provisional application Ser. No. 62/246,869, filed Oct. 27, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes two or more cameras (preferably two or more CMOS cameras, one having a wider field of view and one having a narrower field of view) to capture image data representative of images exterior of the vehicle, and provides enhanced night vision by utilizing a narrow field of view color camera operable to capture color images in low lighting conditions (such as nighttime driving conditions). The narrow field of view camera comprises a lens having optics that provide a field of view of less than about 40 degrees wide and a spectral band filter that passes selected spectral bands of light while attenuating other spectral bands of light, so as to provide enhanced color imaging even in low lighting conditions, such as at nighttime. Color video images derived from image data captured by the narrow view camera or night vision camera are displayed for viewing by the driver of the vehicle, while image data captures by the other (wider view camera) are processed for machine vision functions, such as object detection. Optionally, during daytime or higher lighting conditions (such as daytime driving conditions), the image data captured by the narrow view camera may be processed for object detection.

Therefore, the present invention provides for enhanced night vision to the driver of the vehicle by displaying color video images derived from image data captured by a camera designed for enhanced image capture in low lighting conditions. The system includes two cameras, with the other forward viewing camera used for machine vision applications. The enhanced night vision is provided without thermal sensors or the like. Optionally, an infrared or near infrared illumination source may also be provided to illuminate the area at least partially encompassed by the narrow field of view of the night vision camera to further enhance imaging in low lighting conditions.

These and other objects, advantages, purposes and features of the present invention will become apparent upon review of the following specification in conjunction with the drawings.

DESCRIPTION OF THE PREFERRED EMBODIMENTS

Figure 1:
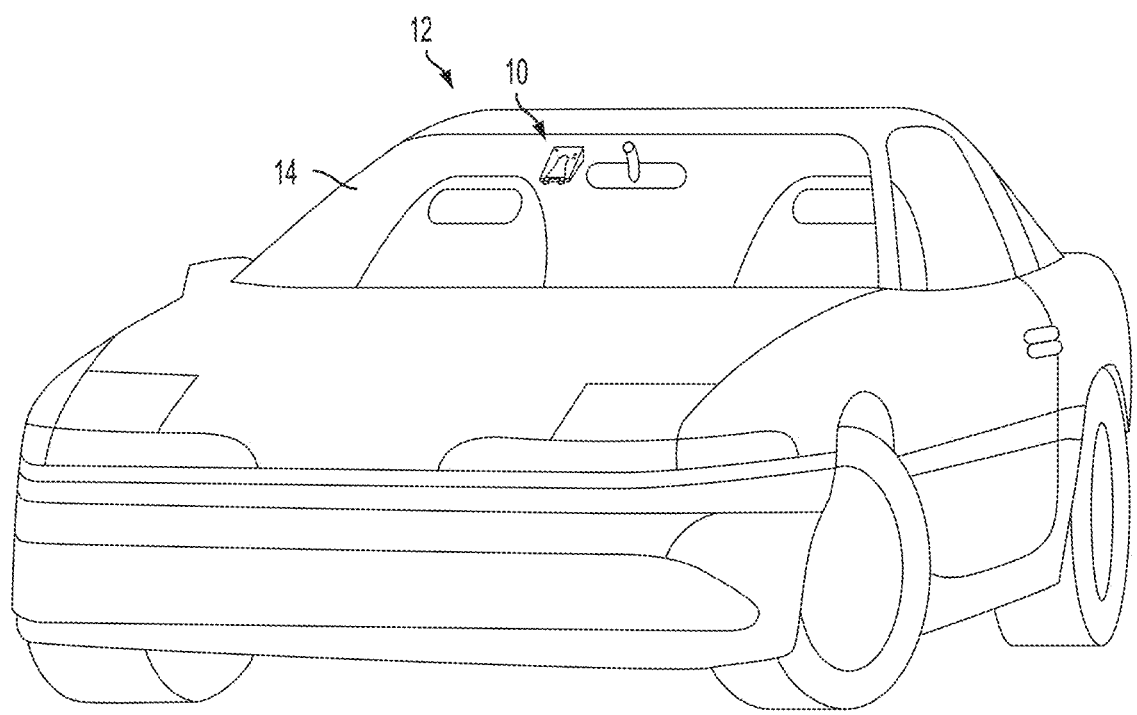
FIG. 1 is a perspective view of a vehicle having a vehicular camera system in accordance with the present invention.

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Referring now to the drawings and the illustrative embodiments depicted therein, a vehicle 12 includes a forward viewing camera or camera module 10 disposed at the windshield 14 of the vehicle so as to view through the windshield and forward of the vehicle, such as for a machine vision system (such as for traffic sign recognition, headlamp control, pedestrian detection, collision avoidance, lane marker detection and/or the like). The vision system includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

The vehicular camera system can be installed on the inside of the front windshield of a vehicle, such as a car, truck, bus, or van. Such a camera system may be used for a variety of functions such as object detection, lane keeping, and high beam control. FIG. 1 shows an example of the vehicular camera system or module 10 configured to be attached in a front-facing manner to a vehicle. The camera system or module 10 can be attached to the windshield 14, as shown, such as via a frame or bracket that is adhesively attached at the windshield via a plurality of fixing elements or attachment elements. Other positions are also possible. The camera system or camera module of the present invention may utilize aspects of the systems and/or modules described in U.S. Pat. Nos. 9,090,213; 8,256,821; 7,480,149; 7,289,037; 7,004,593; 6,824,281; 6,690,268; 6,445,287; 6,428,172; 6,420,975; 6,326,613; 6,278,377; 6,243,003; 6,250,148; 6,172,613 and/or 6,087,953, which are all hereby incorporated herein by reference in their entireties.

Figure 2:
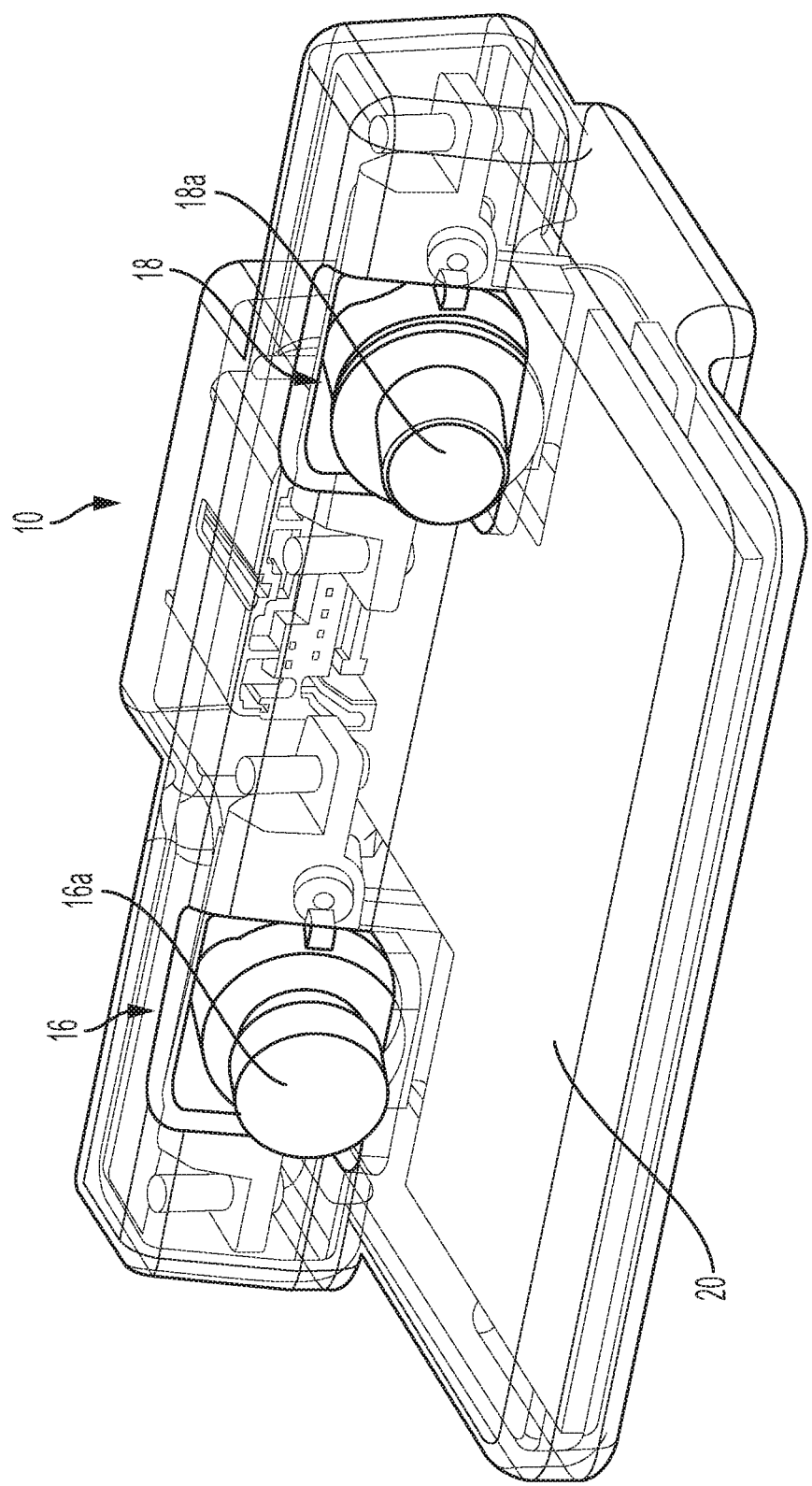
FIG. 2 is a perspective view of a camera module having two cameras in accordance with the present invention.

As shown in FIG. 2, the camera module or system includes two cameras, a wide angle viewing camera 16 and a narrower angle viewing camera 18, with each camera 16, 18 having a respective lens 16a, 18a and imager so as to capture image data for vision systems of the vehicle, as discussed below. Optionally, the camera module may utilize aspects of the camera modules described in U.S. Publication Nos. US-2014-0160284; US-2015-0124098 and/or US-2015-0015713, which are hereby incorporated herein by reference in their entireties.

In the illustrated embodiment, the two cameras 16, 18 are incorporated into a single camera module, and may be electrically connected to a common printed circuit board for processing of captured image data for machine vision and/or for display of captured images. The module 10 includes a stray light shield 20 (such as a stray light shield utilizing aspects of the cameras described in U.S. Publication No. US-2015-0015713, which is hereby incorporated herein by reference in its entirety), and may include a single or common stray light shield for both cameras (such as shown in FIG. 2) or each camera may have a respective stray light shield, depending on the particular application and module (which may have limitations due to size and packaging of two cameras in a single module). Optionally, the module may include heat dissipating means or heat sinks or thermal elements, such as by utilizing aspects of the cameras described in U.S. Publication No. US-2015-0327398, which is hereby incorporated herein by reference in its entirety.

One camera 16 of module 10 comprises a wide angle field of view lens 16a, such as a lens having at least about a 100 degree field of view. Wide view camera 16 captures image data representative of the scene forward of the vehicle and in the path of travel of the vehicle, and the captured image data may be processed by an image processor for one or more machine vision applications, such as lane detection, object detection, pedestrian detection and/or the like. The imager of the wide view camera may comprise a black and white imager or color imager, depending on the particular application of the vision system.

The other camera 18 includes a narrower field of view lens 18a, such as a lens having less than about a 40 degree field of view, such as a lens having about a 30 degree field of view or thereabouts. Narrow view camera 18 comprises a color imager that captures image data representative of a narrower region forward of the vehicle and in the path of travel of the vehicle, and the images captured may be displayed as color video images at a display that is viewable by the driver of the vehicle, such as when driving the vehicle in a forward direction in low lighting conditions (such as nighttime driving conditions). The narrow view camera 18 captures color images for display at nighttime, and the image data captured by the narrow view camera 18 may be processed by the processor (optionally the same processor that processes image data captured by the wide view camera or a separate respective processor) for machine vision applications during daytime or higher lighting conditions (such as daytime driving conditions), as discussed below.

Figure 3:
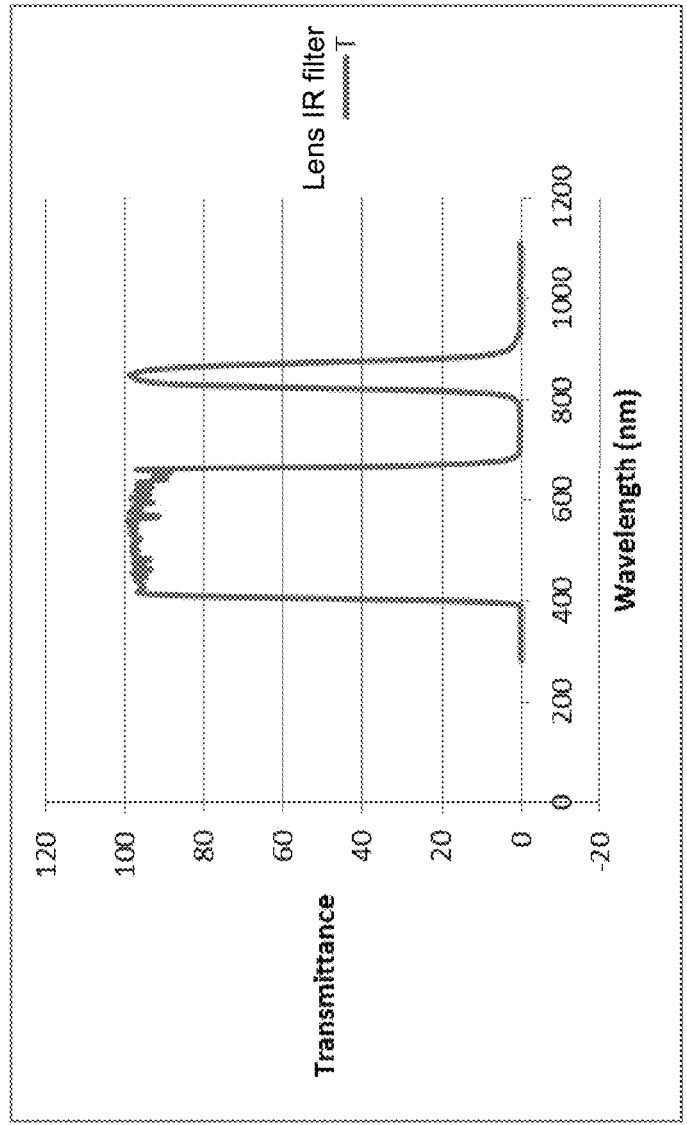
FIG. 3 is a chart showing a lens filter suitable for use with the camera system of the present invention.
Figure 4:
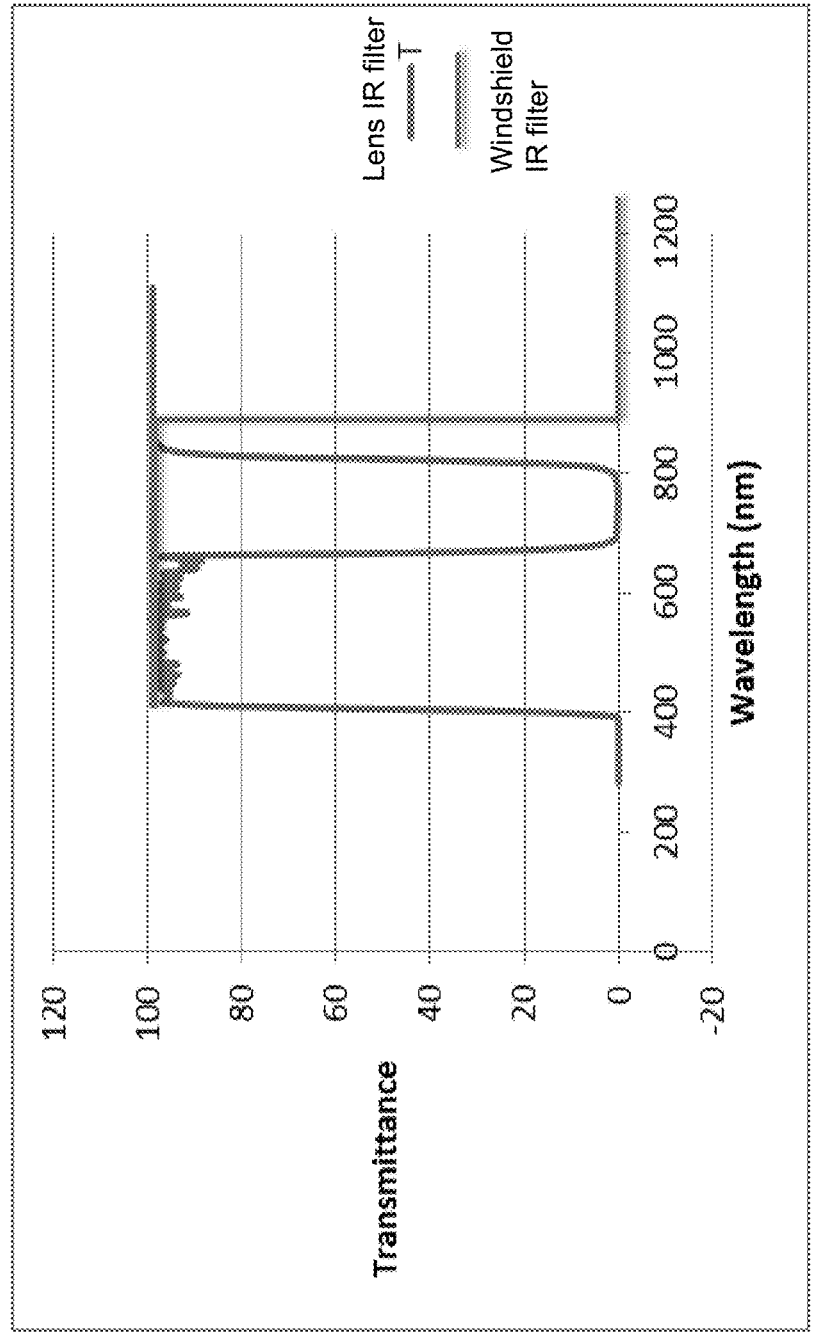
FIG. 4 is another chart showing a lens filter and a windshield IR filter suitable for use with the camera system of the present invention.

Optionally, and such as shown in FIGS. 2 and 3, the narrow view camera may comprise a spectral filter that substantially passes or is transmissive to light having wavelengths between around 400 nm and 700 nm, while substantially blocking or attenuating light having wavelengths between around 700 nm and 800 nm. Optionally, and such as shown in FIG. 2, the spectral filter may also substantially pass or be transmissive to light having wavelengths between around 820 nm and 880 nm, while substantially blocking or attenuating light having wavelengths greater than around 900 nm or thereabouts. The spectral filter may utilize aspects of the cameras and filters described in U.S. Publication No. US-2016-0119527, which is hereby incorporated herein by reference in its entirety. Optionally, and such as shown in FIG. 3, the spectral filter may substantially pass or be transmissive to light having wavelengths greater than around 800 nm, and the windshield may act as an infrared (IR) filter to substantially block or attenuate light having wavelengths greater than around 900 nm or thereabouts. Thus, the spectral filter and windshield may cooperate or combine to effectively provide a dual spectral band pass filter.

The narrow view camera thus images light in the visible spectral band and images light in a near infrared spectral band to provide enhanced imaging in low lighting conditions (such as nighttime driving conditions). Optionally, a near infrared light source (such as one or more light emitting diodes) may emit light within the near infrared spectral band to illuminate the region encompassed by the field of view of the narrow view camera to further enhance imaging of the scene forward of the vehicle during low lighting or nighttime conditions.

Figure 5:
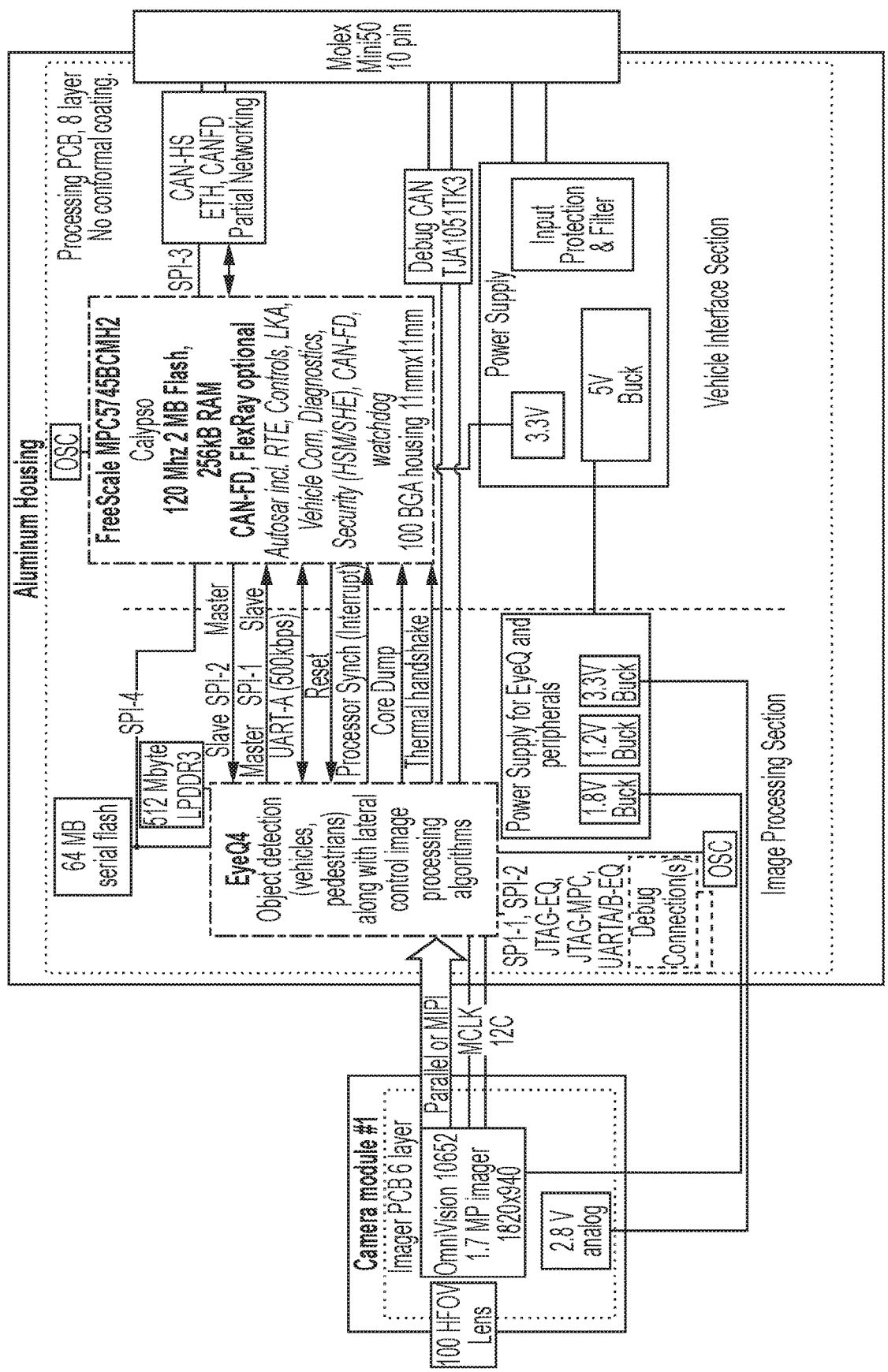
FIG. 5 is a block diagram of a camera system, showing a camera module that captures image data for an image processing section and a vehicle interface section of a control or processor.

As shown in FIG. 5, a wide angle lens camera may capture image data for machine vision applications. The captured image data may be processed by an image processor (such as for object detection and the like), and the processor may generate signals for a vehicle interface section to provide the appropriate feature or function to one or more vehicle systems (such as an alert system or lane departure warning system or lane keeping assist system or automatic emergency braking system or collision avoidance system or headlamp control system or the like), such as via a CAN bus network or vehicle communication bus or the like.

Figure 6:
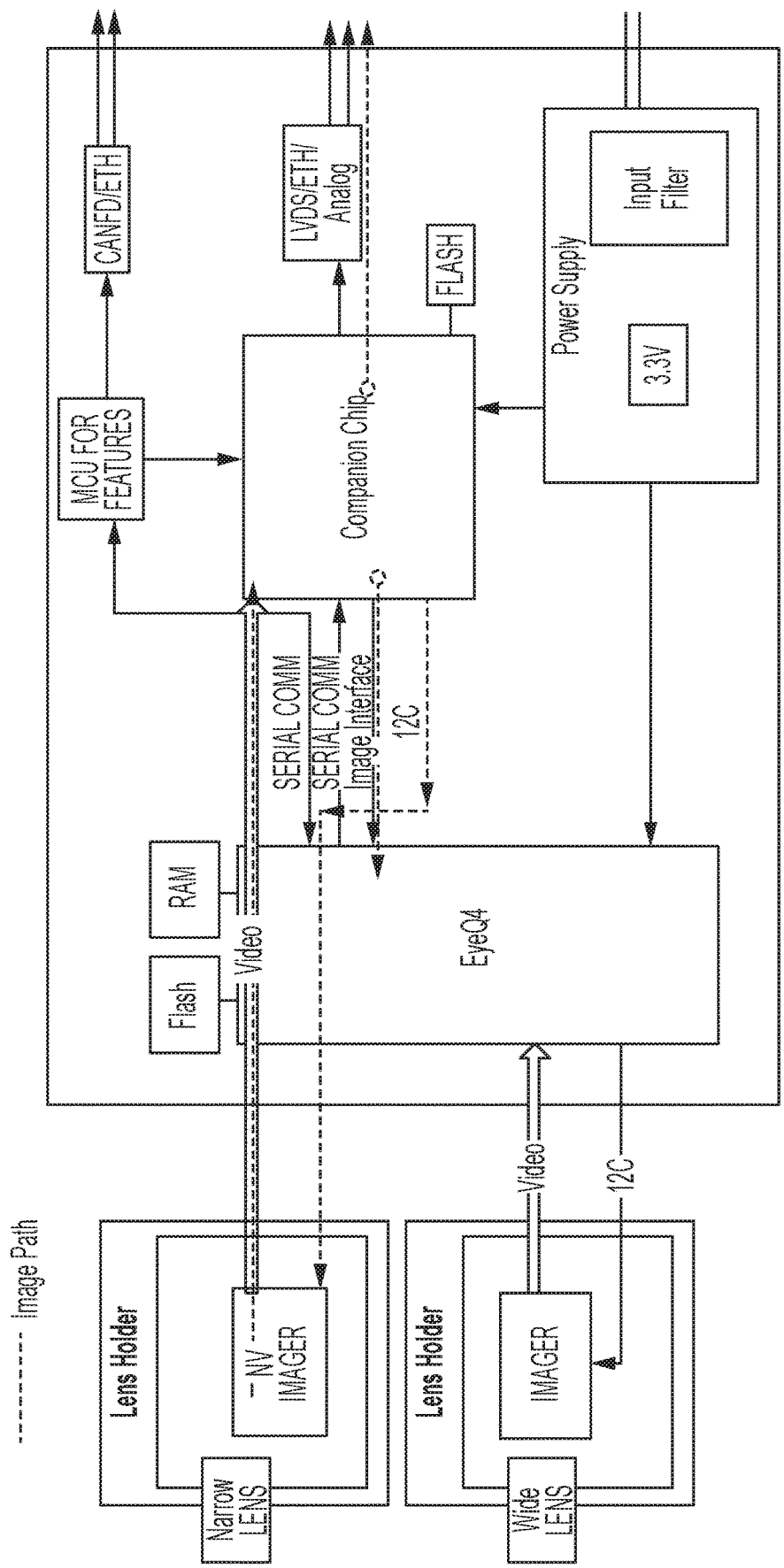
FIG. 6 is a block diagram of another camera system, showing a two camera system having one camera with a narrow field of view lens and another camera with a wide field of view lens in accordance with the present invention.

As shown in FIG. 6, the wide angle lens camera 16 provides image data to an image processor (similar to that shown in FIG. 5), while the narrow view camera 18 provides image data to a companion chip or second processor chip of a module or control system. The companion chip receives the captured image data from the camera 18 and may communicate video images for display at a display screen in the vehicle for viewing by the driver of the vehicle (such as in low lighting conditions where the displayed video images may provide enhanced viewing of the region forward of the vehicle).

The companion chip (or the narrow view camera itself) may also communicate image data captured by the narrow view camera to the image processor for processing to detect objects or the like. For example, the narrow view camera's primary or principal function may be for capturing enhanced images for display of video images during nighttime driving conditions (to provide enhanced night vision to the driver of the vehicle), while the wide view camera's primary or principal function may be for capturing image data for processing for one or more machine vision functions.

Thus, during nighttime conditions (which may be determined by the system responsive to an ambient light sensor or a user input or the like), the display screen (responsive to a signal from the companion chip) may display video images captured by the narrow view camera while the image processor processes image data captured by the wide view camera (for object detection or the like). The companion chip may also receive information from the image processor representative of objects detected via image processing of the image data captured by the wide view camera. Responsive to such information, the companion chip may generate graphic overlays at the display screen displaying the video images to highlight the detected objects in the displayed video images (such as by utilizing aspects of the systems described in U.S. Publication No. US-2016-0162747 and/or U.S. patent application Ser. No. 15/273,752, filed Sep. 23, 2016, now U.S. Pat. No. 10,331,956, which are hereby incorporated herein by reference in their entireties). Thus, the image processor may use image data captured by the wide view camera (and optionally the narrow view camera as well) to detect objects, such as animals or pedestrians or other objects of interest to the driver of the vehicle, and may communicate this to the companion chip, which then generates an overlay and outputs color video images for display with a selected or appropriate graphic overlay.

Optionally, during nighttime driving conditions, the companion chip may also provide control of the narrow view camera, such as exposure control and white balance or color balance control and the like, such that the companion chip controls the narrow view camera to capture enhanced color video images in low light conditions. For example, the companion chip may increase the exposure period of the narrow view camera to enhance imaging during low light conditions. Optionally, the companion chip (or other processor or control) may activate a supplemental infrared or near-infrared light source to provide near infrared light in the field of view of the narrow view camera to further enhance the nighttime imaging by the vision system. Optionally, the companion chip may control the narrow view or night vision camera to switch from color image capture to black and white image capture to further enhance the nighttime imaging by the vision system.

During daytime driving conditions, when the night vision camera or narrow view camera is not needed for its principal night vision purpose, image data captured by the narrow view camera may be processed by the image processor, such as to provide a confirmation of or enhanced detection of the presence of an object or the like ahead of the vehicle. For example, the image processor may process image data captured by the narrow view camera to detect objects further ahead of the vehicle (because the narrow view camera and imager may provide enhanced resolution and greater distance sensing as compared to the wide view camera and imager). The image processor thus may utilize image data captured by both cameras to determine the presence of objects ahead of the vehicle and to identify the objects.

Figure 7:
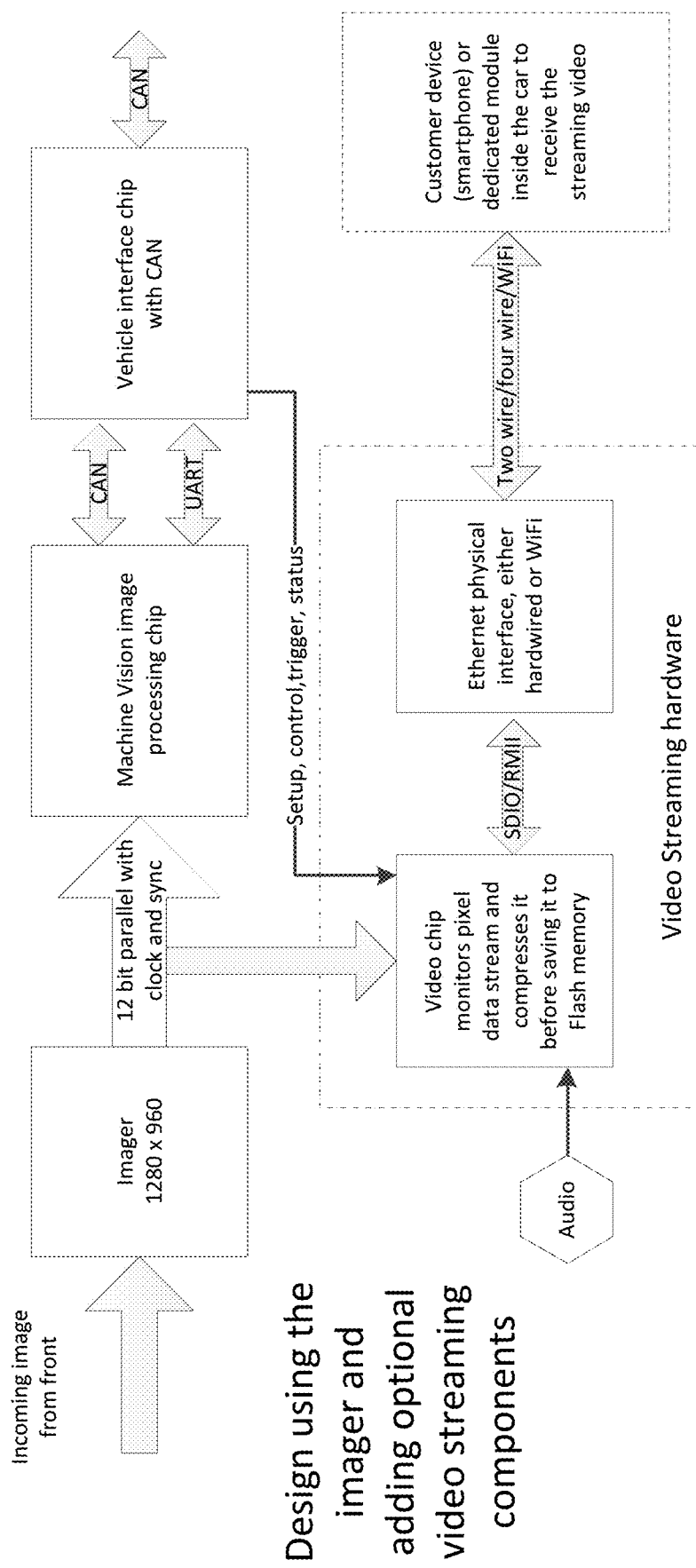
FIG. 7 is a block diagram of an incident recorder concept, showing use of a forward facing camera of the vision system as an incident recording camera.
Figure 8:
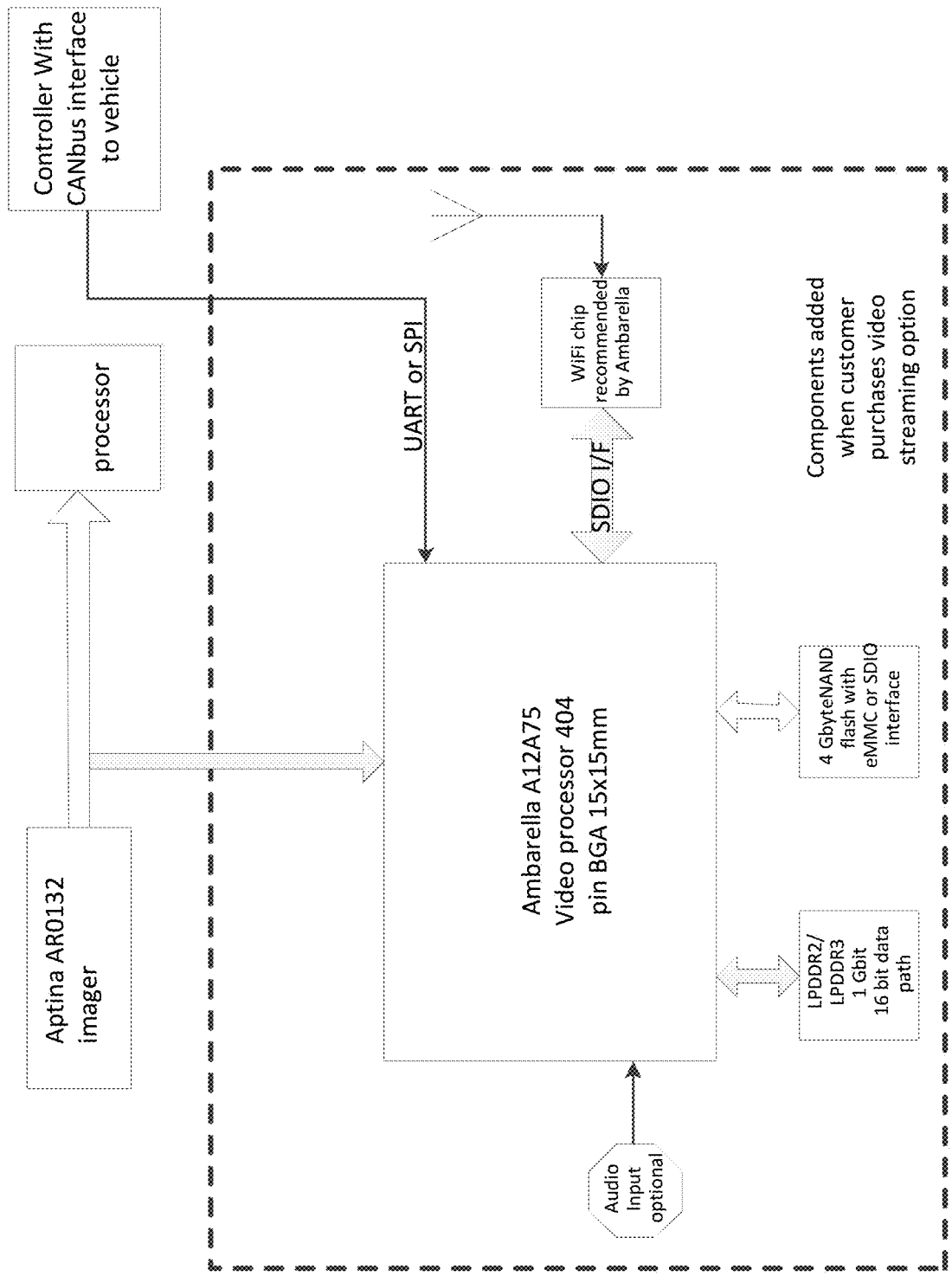
FIG. 8 is a block diagram of video streaming hardware suitable for use in the vision system of the present invention.

Optionally, during daytime driving conditions, the image data captured by the narrow view camera may be used for an incident recorder (see FIGS. 7 and 8). The incident recorder may save captured image data at a memory device of the vehicle or may communicate the captured image data to a customer device, such as a smart phone or the like, to capture and record the streaming video from the camera. The incident recorder function may utilize aspects of the systems described in U.S. Publication No. US-2014-0218529 and/or U.S. patent application Ser. No. 15/147,300, filed May 5, 2016, now U.S. Pat. No. 10,819,943, which are hereby incorporated herein by reference in their entireties.

Therefore, the present invention provides a two camera forward viewing system, with one camera having a wide field of view and capturing image data for object detection and machine vision functions, and the other camera having a narrow field of view and capturing color images for display for enhanced night vision. The two cameras may be disposed at and part of a single camera module (FIG. 2) or the two cameras may be separately disposed at and behind the windshield of the vehicle. The cameras may be spaced about 6 cm apart or less to reduce the difference in views and viewing angles of the cameras, and optionally, the cameras may be adjusted to accommodate the curvature of the windshield so as to have substantially similar viewing angles forward of the vehicle. Optionally, aspects of the enhanced night vision camera and system of the present invention may be used for a rearward viewing camera or system to provide enhanced imaging for a backup assist system or the like (and optionally the IR or near-IR illuminator(s) may be provided in the taillights or the like at the rear of the vehicle).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 8,694,224; 7,005,974; 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,882,287; 6,302,545; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are incorporated herein by reference in their entireties, and/or the like.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:

a camera module configured to be disposed at and behind a vehicle windshield;

wherein said camera module comprises a first camera and a second camera;

wherein, with said camera module disposed at and behind the vehicle windshield, said first camera views through the vehicle windshield and forward of the vehicle and said second camera views through the vehicle windshield and forward of the vehicle;

wherein said first camera comprises a first lens and a first imager, and wherein said first camera has a wide angle field of view through the vehicle windshield greater than 100 degrees;

wherein said first camera is operable to capture image data;

a control comprising a first processor for image processing image data captured by said first camera;

wherein said second camera comprises a second lens and a second imager, and wherein said second camera has a narrow angle field of view through the vehicle windshield less than 40 degrees;

wherein said second camera is operable to capture color image data;

wherein said control comprises a second processor for video processing color image data captured by said second camera;

wherein an output of said second processor comprises color video images derived from video processing of color image data captured by said second camera;

wherein the output of said second processor is provided to a display;

wherein said display displays at a display screen color video images output by said second processor, and wherein said display screen is disposed in the vehicle and is viewable by a driver of the vehicle;

wherein image data captured by said first camera is processed via said first processor to detect objects present in the field of view of said first camera, and wherein image data captured by said first camera is not video processed for display of video images derived from image data captured by said first camera;

wherein, responsive to determination of a nighttime driving condition, said vision system operates in nighttime mode, and wherein, responsive to determination of a daytime driving condition, said vision system operates in daytime mode, and wherein, with said vision system operating in daytime mode, said vision system, via processing by said first processor of image data captured by said first camera, and via processing by said second processor of color image data captured by said second camera, is operable to (i) detect objects present in the wide angle field of view of said first camera and (ii) detect objects present in the narrow angle field of view of said second camera; and wherein said vision system, responsive to ambient light, switches from nighttime mode, where color video images derived from color image data captured by said second camera are displayed at said display screen, to daytime mode, where color image data captured by said second camera is processed by said second processor to detect objects present in the narrow angle field of view of said second camera.

2. The vision system of claim 1, wherein, with said vision system operating in nighttime mode, and responsive to an input from said second camera, said second processor generates color video images for display by said display screen.

3. The vision system of claim 2, wherein said second processor, responsive to an input from said first processor, generates a graphic overlay to highlight at the displayed color video images an object detected by said first processor via image processing of image data captured by said first camera.

4. The vision system of claim 2, wherein, with said vision system operating in nighttime mode, said second processor controls said second camera to enhance night vision.

5. The vision system of claim 4, wherein said second processor is operable to adjust an exposure period of said second camera.

6. The vision system of claim 1, comprising a near infrared illumination source operable, when said vision system is operating in nighttime mode, to illuminate an area ahead of the vehicle at least partially encompassed by the narrow field of view of said second camera.

7. The vision system of claim 1, wherein said second camera comprises a spectral filter that passes visible light having wavelengths between 400 nm and 700 nm and attenuates electromagnetic radiation having wavelengths between 700 nm and 800 nm.

8. The vision system of claim 7, wherein said spectral filter passes electromagnetic radiation having wavelengths between 820 nm and 880 nm and attenuates electromagnetic radiation having wavelengths greater than 900 nm.

9. The vision system of claim 7, wherein said spectral filter passes electromagnetic radiation having wavelengths greater than 800 nm, and the vehicle windshield attenuates electromagnetic radiation having wavelengths greater than 900 nm.

10. The vision system of claim 1, wherein said camera module comprises a housing disposed at the vehicle windshield and wherein said first and second cameras are commonly housed at said housing of said camera module.

11. The vision system of claim 10, wherein said first processor and said second processor are commonly housed at said housing of said camera module.

12. The vision system of claim 1, wherein said first camera and said second camera are spaced apart by no more than 6 cm.

13. The vision system of claim 1, wherein said second camera has a narrow angle field of view through the vehicle windshield that is no less than 30 degrees.

14. A vision system of a vehicle, said vision system comprising:

a camera module configured to be disposed at and behind a vehicle windshield;

wherein said camera module comprises a first camera and a second camera;

wherein, with said camera module disposed at and behind the vehicle windshield, said first camera views through the vehicle windshield and forward of the vehicle and said second camera views through the vehicle windshield and forward of the vehicle;

wherein said first camera comprises a first lens and a first imager, and wherein said first camera has a wide angle field of view through the vehicle windshield greater than 100 degrees;

wherein said first camera is operable to capture image data;

a control comprising a first processor for image processing image data captured by said first camera;

wherein said second camera comprises a second lens and a second imager, and wherein said second camera has a narrow angle field of view through the vehicle windshield less than 40 degrees;

wherein said second camera is operable to capture color image data;

wherein said control comprises a second processor for video processing color image data captured by said second camera;

wherein an output of said second processor comprises color video images derived from video processing of color image data captured by said second camera;

wherein the output of said second processor is provided to a display;

wherein said second camera comprises a spectral filter that passes visible light having wavelengths between 400 nm and 700 nm and attenuates electromagnetic radiation having wavelengths between 700 nm and 800 nm;

wherein said display displays at a display screen color video images output by said second processor, and wherein said display screen is disposed in the vehicle and is viewable by a driver of the vehicle;

wherein image data captured by said first camera is processed via said first processor to detect objects present in the field of view of said first camera, and wherein image data captured by said first camera is not video processed for display of video images derived from image data captured by said first camera;

wherein, responsive to determination of a nighttime driving condition, said vision system operates in nighttime mode, and wherein, responsive to determination of a daytime driving condition, said vision system operates in daytime mode;

wherein, with said vision system operating in nighttime mode, color video images output by said second processor are displayed at said display screen and image data captured by said first camera is processed by said first processor to detect objects present in the wide angle field of view of said first camera; and wherein, with said vision system operating in daytime mode, color video images derived from image data captured by said second camera are not displayed at said display screen.

15. The vision system of claim 14, wherein said vision system, responsive to an ambient light sensor, switches from nighttime mode, where color video images output by said second processor are displayed at said display screen, to daytime mode, where color image data captured by said second camera is processed by said second processor to detect objects present in the narrow angle field of view of said second camera.

16. The vision system of claim 14, wherein said second camera comprises a spectral filter, and wherein the vehicle windshield comprises an infrared filter, and wherein, when light passes through the vehicle windshield and through said spectral filter, said spectral filter and said infrared filter combine to provide a dual spectral band pass filter, and wherein said infrared filter passes electromagnetic radiation having wavelengths between 820 nm and 880 nm and attenuates electromagnetic radiation having wavelengths greater than 900 nm.

17. The vision system of claim 14, wherein said second camera comprises a spectral filter, and wherein the vehicle windshield comprises an infrared filter, and wherein, when light passes through the vehicle windshield and through said spectral filter, said spectral filter and said infrared filter combine to provide a dual spectral band pass filter, and wherein said spectral filter passes electromagnetic radiation having wavelengths greater than 800 nm, and said infrared filter of the vehicle windshield attenuates electromagnetic radiation having wavelengths greater than 900 nm.

18. A vision system of a vehicle, said vision system comprising:

a camera module configured to be disposed at and behind a vehicle windshield;

wherein said camera module comprises a first camera and a second camera;

wherein, with said camera module disposed at and behind the vehicle windshield, said first camera views through the vehicle windshield and forward of the vehicle and said second camera views through the vehicle windshield and forward of the vehicle;

wherein said first camera comprises a first lens and a first imager, and wherein said first camera has a wide angle field of view through the vehicle windshield greater than 100 degrees;

wherein said first camera is operable to capture image data;

a control comprising a first processor for image processing image data captured by said first camera;

wherein said second camera comprises a second lens and a second imager, and wherein said second camera has a narrow angle field of view through the vehicle windshield less than 40 degrees;

wherein said second camera is operable to capture color image data;

wherein said control comprises a second processor for video processing color image data captured by said second camera;

wherein an output of said second processor comprises color video images derived from video processing of color image data captured by said second camera;

wherein the output of said second processor is provided to a display;

wherein said camera module comprises a housing disposed at the vehicle windshield, and wherein said first and second cameras are commonly housed at said housing of said camera module;

a near infrared illumination source operable to illuminate an area ahead of the vehicle at least partially encompassed by the narrow field of view of said second camera;

wherein said display displays at a display screen color video images output by said second processor, and wherein said display screen is disposed in the vehicle and is viewable by a driver of the vehicle;

wherein image data captured by said first camera is processed via said first processor to detect objects present in the field of view of said first camera, and wherein image data captured by said first camera is not video processed for display of video images derived from image data captured by said first camera;

wherein, responsive to determination of a nighttime driving condition, said vision system operates in nighttime mode, and wherein, responsive to determination of a daytime driving condition, said vision system operates in daytime mode;

wherein, with said vision system operating in nighttime mode, color video images output by said second processor are displayed at said display screen and image data captured by said first camera is processed by said first processor to detect objects present in the wide angle field of view of said first camera; and wherein, with said vision system operating in daytime mode, color video images derived from image data captured by said second camera are not displayed at said display screen.

19. The vision system of claim 18, wherein said first processor and said second processor are commonly housed at said housing of said camera module.

\* \* \* \* \*

UNITED STATES PATENT AND TRADEMARK OFFICE
CERTIFICATE OF CORRECTION

PATENT NO. : 10,875,403 B2  
APPLICATION NO. : 15/334364  
DATED : December 29, 2020  
INVENTOR(S) : Christopher L. Van Dan Elzen et al.

Page 1 of 1

It is certified that error appears in the above-identified patent and that said Letters Patent is hereby corrected as shown below:

On the Title Page

Under item (57) Abstract:
Line 13, "procesed" should be --processed--

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*